United States Patent
Tsujiko et al.

(10) Patent No.: US 10,622,619 B2
(45) Date of Patent: Apr. 14, 2020

(54) NEGATIVE ELECTRODE PLATE AND NON-AQUEOUS ELECTROLYTE SECONDARY BATTERY

(71) Applicant: TOYOTA JIDOSHA KABUSHIKI KAISHA, Toyota-shi, Aichi-ken (JP)

(72) Inventors: Akira Tsujiko, Miyoshi (JP); Ryosuke Ohsawa, Okazaki (JP); Kaoru Inoue, Hirakata (JP); Akihiro Taniguchi, Ashiya (JP); Keisuke Ohara, Osaka (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/157,644

(22) Filed: Oct. 11, 2018

(65) Prior Publication Data

US 2019/0115585 A1 Apr. 18, 2019

(30) Foreign Application Priority Data

Oct. 12, 2017 (JP) .................. 2017-198320

(51) Int. Cl.
*H01M 10/0525* (2010.01)
*H01M 4/133* (2010.01)
(Continued)

(52) U.S. Cl.
CPC ........... *H01M 4/133* (2013.01); *H01M 4/364* (2013.01); *H01M 4/366* (2013.01); *H01M 4/483* (2013.01); *H01M 4/587* (2013.01); *H01M 4/625* (2013.01); *H01M 10/0525* (2013.01); *H01M 2004/021* (2013.01); *H01M 2004/027* (2013.01); *H01M 2220/20* (2013.01)

(58) Field of Classification Search
None
See application file for complete search history.

(56) References Cited

U.S. PATENT DOCUMENTS

| 7,192,673 B1 * | 3/2007 | Ikeda | H01M 4/13 |
|---|---|---|---|
| | | | 429/209 |
| 2002/0009646 A1 * | 1/2002 | Matsubara | H01M 2/32 |
| | | | 429/231.8 |

(Continued)

FOREIGN PATENT DOCUMENTS

| JP | 2006-196338 A | 7/2006 |
|---|---|---|
| JP | 2006-339093 A | 12/2006 |

(Continued)

*Primary Examiner* — Haroon S. Sheikh
(74) *Attorney, Agent, or Firm* — Sughrue Mion, PLLC

(57) ABSTRACT

The negative electrode plate includes at least a negative electrode composite material layer. The negative electrode composite material layer has a density of 1.5 g/cm³ or more. The negative electrode composite material layer contains at least first particles, second particles and a binder. The first particles contain graphite particles and an amorphous carbon material. The amorphous carbon material is coated on the surface of each graphite particle. The second particles are made of silicon oxide. The ratio of the second particles to the total amount of the first particles and the second particles is 2 mass % or more to 10 mass % or less. The negative electrode plate has a spring constant of 700 kN/mm or more to 3000 kN/mm or less.

5 Claims, 3 Drawing Sheets

(51) Int. Cl.
*H01M 4/36* (2006.01)
*H01M 4/48* (2010.01)
*H01M 4/587* (2010.01)
*H01M 4/62* (2006.01)
*H01M 4/02* (2006.01)

(56) References Cited

U.S. PATENT DOCUMENTS

| | | | |
|---|---|---|---|
| 2002/0164479 A1* | 11/2002 | Matsubara | H01M 4/362 428/367 |
| 2007/0092796 A1 | 4/2007 | Matsuda et al. | |
| 2015/0125746 A1 | 5/2015 | Sonobe et al. | |
| 2015/0132644 A1 | 5/2015 | Sonobe et al. | |
| 2015/0263339 A1* | 9/2015 | Kouzu | H01M 4/131 429/231.4 |
| 2015/0287989 A1 | 10/2015 | Hirose et al. | |
| 2017/0012290 A1 | 1/2017 | Watanabe et al. | |

FOREIGN PATENT DOCUMENTS

| | | |
|---|---|---|
| JP | 2014-007120 A | 1/2014 |
| JP | 2015-198038 A | 11/2015 |
| JP | 2016-066508 A | 4/2016 |
| JP | 2016-066529 A | 4/2016 |
| WO | 2013/183717 A1 | 12/2013 |
| WO | 2014/002883 A1 | 1/2014 |
| WO | 2015/118834 A1 | 8/2015 |

\* cited by examiner

NEGATIVE ELECTRODE PLATE AND NON-AQUEOUS ELECTROLYTE SECONDARY BATTERY

This non-provisional application is based on Japanese Patent Application No. 2017-198320 filed on Oct. 12, 2017 with the Japan Patent Office, the entire contents of which are hereby incorporated by reference.

BACKGROUND

Field

The present disclosure relates to a negative electrode plate and a non-aqueous electrolyte secondary battery.

Description of the Background Art

As a binder for a negative electrode plate containing silicon oxide, Japanese Patent Laying-Open No. 2016-066508 discloses a composite of carboxymethyl cellulose and at least one of polyacrylic acid, styrene butadiene rubber and polyvinylidene difluoride.

SUMMARY

Graphite is used as a negative electrode active material for a non-aqueous electrolyte secondary battery (hereinafter abbreviated as "battery" where necessary). Silicon oxide has also been investigated as a negative electrode active material. Silicon oxide has a greater specific capacity (capacity per unit mass) than graphite. Thus, it is possible to improve the capacity of the battery by replacing a part of graphite in the negative electrode plate with silicon oxide.

However, replacing a part of the graphite with silicon oxide is likely to decrease charge/discharge cycle characteristics.

An object of the present disclosure is to improve charge/discharge cycle characteristics of a non-aqueous electrolyte secondary battery containing graphite and silicon oxide as a negative electrode active material.

Hereinafter, the technical configuration and effects of the present disclosure will be described. However, the mechanism of action described in the present disclosure includes a presumption. Whether the mechanism of action is correct or not should not limit the scope of the claims.

[1] The negative electrode plate of the present disclosure is used in a non-aqueous electrolyte secondary battery. The negative electrode plate includes at least a negative electrode composite material layer. The negative electrode composite material layer has a density of 1.5 g/cm³ or more. The negative electrode composite material layer contains at least first particles, second particles and a binder. The first particles contain graphite particles and an amorphous carbon material. The amorphous carbon material is coated on the surface of each graphite particle. The second particles are made of silicon oxide. The ratio of the second particles to the total amount of the first particles and the second particles is 2 mass % or more to 10 mass % or less. The negative electrode plate has a spring constant of 700 kN/mm or more to 3000 kN/mm or less.

In the negative electrode plate of the present disclosure, the first particles and the second particles are the negative electrode active material. The first particles contain graphite particles. The second particles are made of silicon oxide. The first particles further contain an amorphous carbon material. The amorphous carbon material is coated on the surface of each graphite particle.

In the negative electrode composite material layer, the second particles (silicon oxide) are embedded in the first particles, and thus it is considered that the first particles and the second particles adhere to each other closely. The second particles are relatively hard. Since the first particles and the second particles adhere to each other closely, it is considered that a conductive path may be formed between the first particles and the second particles.

The second particles (silicon oxide) expand greatly during charging and contract greatly during discharging. Therefore, the negative electrode plate may deform due to repeated charging and discharging. Due to the deformation of the negative electrode plate, the embedding state of the first particles and the second particles may become loose. As a result, the first particles and the second particles fail to adhere to each other closely, leading to the deterioration of the charge/discharge cycle characteristics.

The negative electrode plate of the present disclosure has a spring constant of 700 kN/mm or more, and thereby the negative electrode plate may have a rigidity (difficulty in deformation) to withstand the expansion and contraction of silicon oxide. In other words, if the spring constant is 700 kN/mm or more, it is possible to improve the charge/discharge cycle characteristics. However, if the spring constant exceeds 3000 kN/mm, the charge/discharge cycle characteristics may be deteriorated. The considerable reason may be that the binder is likely to break easily. Therefore, the negative electrode plate of the present disclosure has a spring constant of 700 kN/mm or more to 3000 kN/mm or less.

The negative electrode composite material layer has a density of 1.5 g/cm³ or more. If the first particles and the second particles are filled so that the negative electrode composite material layer has a density of 1.5 g/cm³ or more, it is considered that the first particles and the second particles may adhere to each other sufficiently. If the density of the negative electrode composite material layer is less than 1.5 g/cm³, the adhesion between the first particles and the second particles becomes insufficient, which may deteriorates the charge/discharge cycle characteristics.

The ratio of the second particles to the total amount of the first particles and the second particles is 2 mass % or more to 10 mass % or less. If the ratio of the second particles is less than 2 mass %, the increase in capacity is small. If the second particles exceeds 10 mass %, even though the spring constant is 700 kN/mm or more, the negative electrode plate may deform, in other words, the charge/discharge cycle characteristics may be deteriorated.

[2] The first particles may have a compression breaking strength of 25 MPa or more to 70 MPa or less. The compression breaking strength of the first particles may be controlled by coating, for example, an amorphous carbon material on the graphite particles. Through the inclusion of the amorphous carbon material so that the compression breaking strength of the first particles is 25 MPa or more, it is possible to improve, for example, the charging reactivity at low temperature.

The higher the compression breaking strength of the first particles is, the greater the spring constant of the negative electrode plate would be. However, if the compression breaking strength of the first particles is excessively high, it may be difficult for the second particles to embed into the first particles. In other words, the adhesion between the first particles and the second particles may be deteriorated. If the compressive breaking strength of the first particles is 70

MPa or less, the adhesion between the first particles and the second particles is well balanced with the spring constant, which makes it possible to improve the charge/discharge cycle characteristics.

[3] The negative electrode plate may have a spring constant of 1000 kN/mm or more to 2500 kN/mm or less, which makes it possible to improve the charge/discharge cycle characteristics.

[4] The ratio of the second particles to the total amount of the first particles and the second particles may be 4 mass % or more to 8 mass % or less. In this range, for example, it is possible to improve the balance between the charge/discharge cycle characteristics and the capacity.

[5] The non-aqueous electrolyte secondary battery of the present disclosure includes at least the negative electrode plate described in the above [1] to [4]. Thereby, it is expected that the non-aqueous electrolyte secondary battery of the present disclosure may have a high capacity, and it is expected that the non-aqueous electrolyte secondary battery of the present disclosure may have excellent charge/discharge cycle characteristics.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Hereinafter, an embodiment of the present disclosure (also referred to as "the present embodiment" in the present specification) will be described. It should be noted that the following description is not intended to limit the scope of claims.

Hereinafter, the description will be carried out on a lithium ion secondary battery serving as an example of a non-aqueous electrolyte secondary battery. However, it should be noted that the non-aqueous electrolyte secondary battery of the present embodiment is not limited to a lithium ion secondary battery, it may be, for example, a sodium ion secondary battery or the like.

<Non-Aqueous Electrolyte Secondary Battery>

Figure 1:
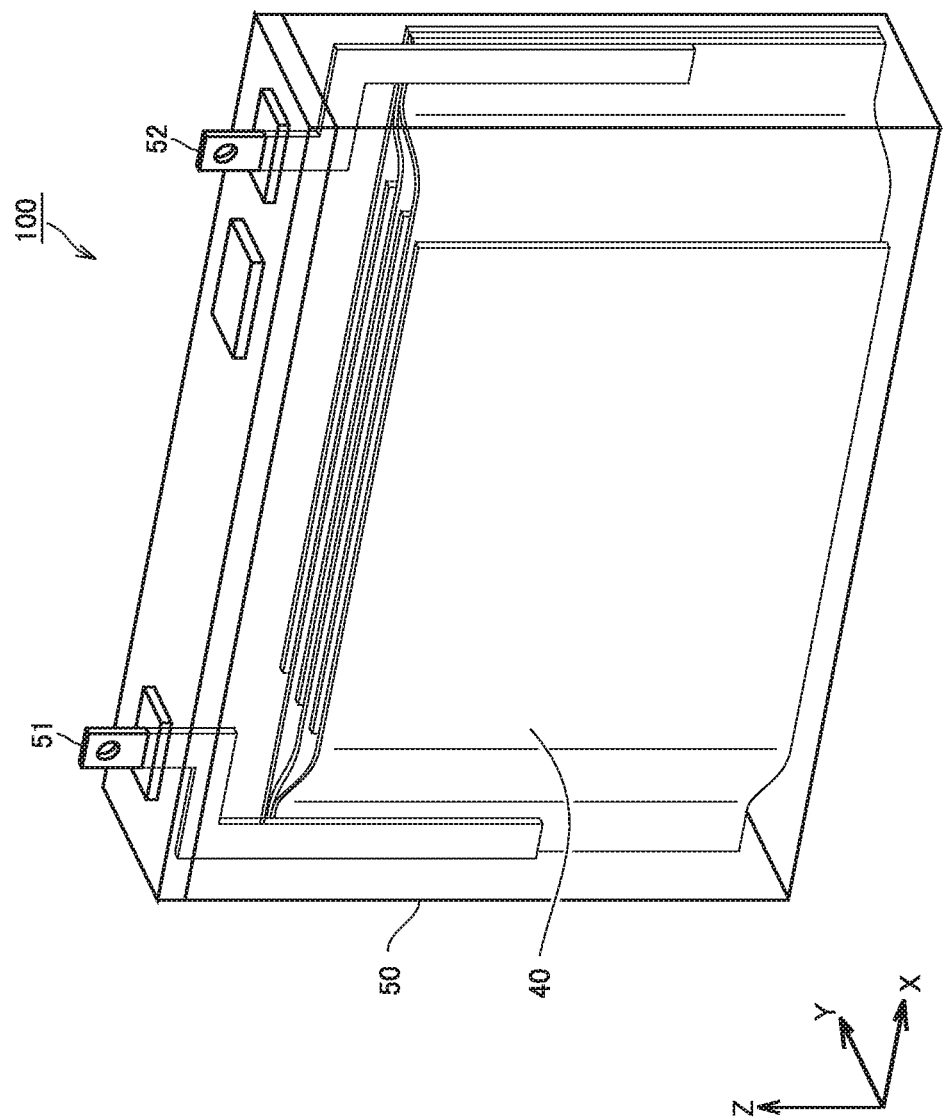
FIG. 1 is a schematic view illustrating an example configuration of a non-aqueous electrolyte secondary battery according to an embodiment.

FIG. 1 is a schematic view illustrating an example configuration of a non-aqueous electrolyte secondary battery according to the present embodiment.

The battery 100 includes a case 50. The case 50 is hermetically sealed. The case 50 is provided with a positive electrode terminal 51 and a negative electrode terminal 52. The case 50 may be made of, for example, an aluminum (Al) alloy or the like. The case 50 houses an electrode group 40 and a non-aqueous electrolyte. The case 50 has a prismatic shape (flat rectangular parallelepiped shape). It should be noted that the case of the present embodiment is not limited to the prismatic shape.

The case may be cylindrical. The case may be in the form of a pouch made of, for example, Al laminated film or the like. In other words, the battery of the present embodiment may be a laminate-type battery.

Figure 2:
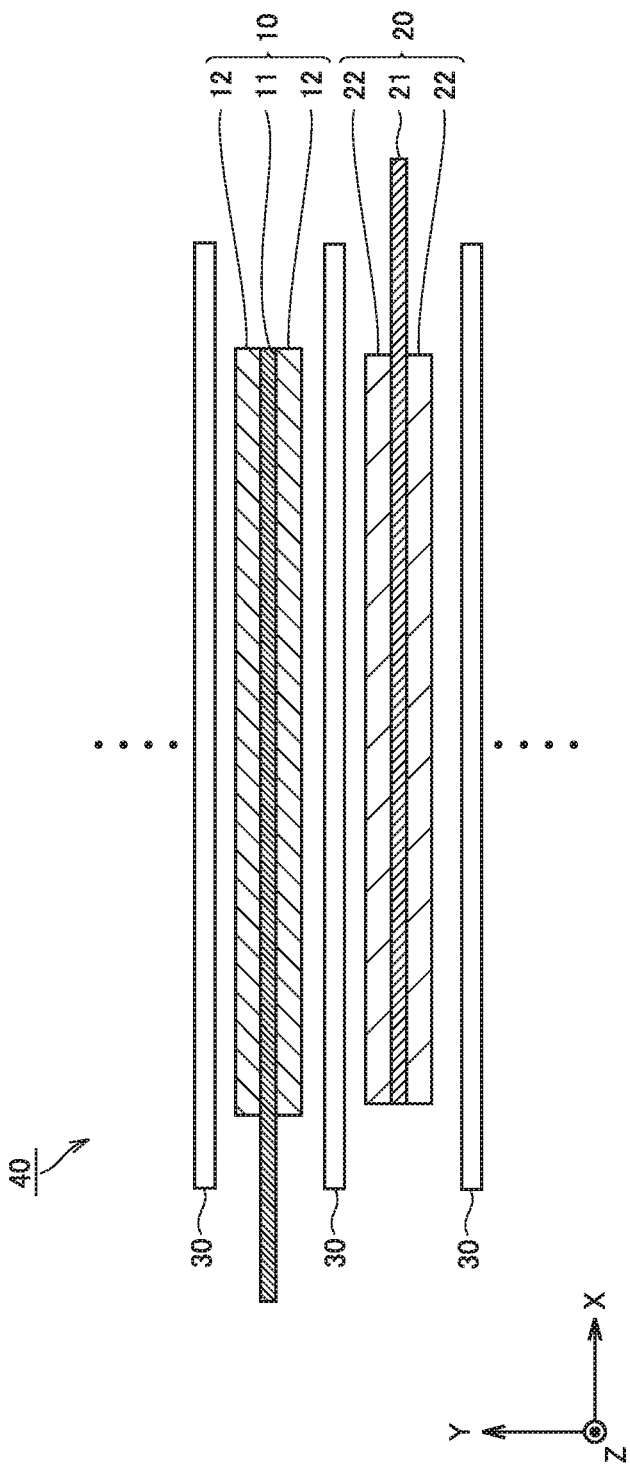
FIG. 2 is a conceptual cross-sectional view illustrating an example configuration of an electrode group according to an embodiment.

FIG. 2 is a conceptual cross-sectional view illustrating an example configuration of an electrode group according to the present embodiment.

The electrode group 40 is a laminate type (stack type) electrode. The electrode group 40 is formed by alternately stacking a positive electrode plate 10 and a negative electrode plate 20 with a separator 30 sandwiched between the positive electrode plate 10 and the negative electrode plate 20. In other words, the battery 100 includes at least the negative electrode plate 20. The non-aqueous electrolyte is present in the gaps in the electrode group 40.

It should be noted that the electrode group may be a winding type electrode. The winding type electrode group may be formed, for example, by stacking a positive electrode, a separator and a negative electrode in order and winding the same spirally.

<Negative Electrode Plate>

The negative electrode plate 20 contains graphite and silicon oxide as a negative electrode active material. The negative electrode plate 20 has a given spring constant as described later. Thus, the negative electrode plate 20 may have a rigidity to withstand the expansion and contraction of silicon oxide, which makes it possible to improve the charge/discharge cycle characteristics.

The negative electrode plate 20 includes a negative electrode current collector 21 and a negative electrode composite material layer 22. In other words, the negative electrode plate 20 includes at least the negative electrode composite material layer 22. The negative electrode current collector 21 is electrically connected to the negative electrode terminal 52. The negative electrode current collector 21 may be, for example, a copper (Cu) foil, a Cu alloy foil or the like. The negative electrode current collector 21 may have a thickness of, for example, 5 μm or more to 50 μm or less. The negative electrode current collector 21 may have a thickness of, for example, 5 μm or more to 15 μm or less.

In the present specification, the thickness of each component may be measured by using a micrometer or the like. The thickness of each component may be measured from a microscope image or the like of a section of each component. The thickness of each component may be measured at least at three positions, and an arithmetic average of the thicknesses measured at least at three positions may be adopted as the measurement result.

"Negative Electrode Composite Material Layer"

The negative electrode composite material layer 22 is formed on a surface of the negative electrode current collector 21. The negative electrode composite material layer 22 may be formed on both the front surface and the back surface of the negative electrode current collector 21. The negative electrode composite material layer 22 may have a thickness of, for example, 10 μm or more to 200 μm or less. The negative electrode composite material layer 22 may have a thickness of, for example, 20 μm or more to 150 μm or less. The negative electrode composite material layer 22 may have a thickness of, for example, 30 μm or more to 100 μm or less.

"Density of Negative Electrode Composite Material Layer"

The density of the negative electrode composite material layer 22 is calculated by dividing the mass of the negative electrode composite material layer 22 by the apparent volume of the negative electrode composite material layer 22.

The apparent volume of the negative electrode composite material layer 22 is calculated from external dimensions (for example, the thickness and the area) of the negative electrode composite material layer 22.

The negative electrode composite material layer 22 has a density of 1.5 g/cm³ or more. Thereby, it is considered that the first particles and the second particles may adhere to each other sufficiently. If the density of the negative electrode composite material layer is less than 1.5 g/cm³, the adhesion between the first particles and the second particles is insufficient, which may deteriorates the charge/discharge cycle characteristics.

Since the negative electrode composite material layer 22 has a higher density, it is expected that the negative electrode plate 20 may have a greater spring constant. Further, since the negative electrode composite material layer 22 has a higher density, it is expected that the second particles may be embedded well into the first particles, in other words, the anchor effect may be improved. However, if the density of the negative electrode composite material layer 22 is excessively high, it may be more difficult for the electrolytic solution to soak into the negative electrode composite material layer 22. The negative electrode composite material layer 22 may have a density of 1.8 g/cm³ or less, for example. The negative electrode composite material layer 22 may have a density of 1.7 g/cm³ or less, for example.

"Composition of Negative Electrode Composite Material Layer"

The negative electrode composite material layer 22 contains at least a negative electrode active material and a binder. The negative electrode active material includes first particles and second particles. In other words, the negative electrode composite material layer 22 contains at least first particles, second particles and a binder.

(First Particle)

The first particles may have a d50 of, for example, 1 μm or more to 30 μm or less. In the present specification, the d50 may be determined by laser diffraction method. In the volume-based cumulative particle size distribution, 50% of the particles may have a particle size smaller than d50, and 50% of the particles may have a particle size larger than d50. The first particles may have a d50 of, for example, 9 μm or more to 20 μm or less. The first particles it not particularly limited in shape. The first particles may be, for example, spherical, bulky, flaky or the like.

The first particles contain graphite particles and an amorphous carbon material. The graphite particles may contain natural graphite. The graphite particles may contain artificial graphite. The graphite particles may be spheroidized natural graphite, for example. The term of "spheroidized natural graphite" refers to natural graphite (flake graphite) subjected to a spheroidizing treatment. The spheroidizing treatment refers to such a treatment that brings the shape of particles approximately to a spherical shape by friction, pulverization or the like in an air current.

The amorphous carbon material is coated on the surface of each graphite particle. The "amorphous carbon material" in the present specification is not limited to a complete amorphous carbon material. The "amorphous carbon material" in the present specification includes not only a material containing a crystal structure (graphite structure) in which hexagonal net surfaces are laminated but also a material with lower crystallinity than natural graphite. The amorphous carbon material may be produced by, for example, heat treatment of petroleum pitch, coal pitch, phenol resin, acrylonitrile or the like.

Crystallinity may be evaluated based on, for example, the average spacing of (002) planes. The larger the average spacing of (002) planes is, the lower the crystallinity will be evaluated. The average spacing of (002) planes may be measured by X-ray diffraction (XRD) method. Natural graphite may have an average spacing of (002) planes of 0.3354 nm to 0.3356 nm, for example. The amorphous carbon material may have an average spacing of (002) planes of 0.3357 nm to 0.3400 nm, for example.

The ratio of the amorphous carbon material to the total amount of the graphite particles and the amorphous carbon material may be, for example, 1 mass % or more to 10 mass % or less.

(Compression Breaking Strength)

The higher the compression breaking strength of the first particles is, the higher the spring constant of the negative electrode plate 20 will be. The compression breaking strength of the first particles may be controlled by adjusting, for example, the porosity of the first particles, the coating amount of the amorphous carbon material, the crystallinity of the graphite particles, the crystallinity of the amorphous carbon material and the like. The crystallinity of the graphite particles and the crystallinity of the amorphous carbon material may be controlled by adjusting, for example, a heating temperature (sintering temperature). When the heating temperature is a relatively lower (for example, 800° C. or more and less than 1000° C.), it is likely that the compression breaking strength of the first particles becomes higher. The general sintering temperature is, for example, 1000° C. or more to 2000° C. or less.

The compression breaking strength of the first particles may be measured by using a micro compression tester. For example, a micro compression tester of "MCT series" manufactured by Shimadzu Corporation or an equivalent one may be used. The compression breaking strength may be measured at least three times, and the arithmetic average of the at least three measurements may be adopted as the measurement result.

The first particles may have a compression breaking strength of, for example, 15 MPa or more to 90 MPa or less. The first particles may have a compression breaking strength of 25 MPa or more to 70 MPa or less. Through the inclusion of the amorphous carbon material so that the compression breaking strength of the first particles is 25 MPa or more, it is possible to improve, for example, the charging reactivity at low temperature.

When the compressive breaking strength of the first particles is 70 MPa or less, the adhesion between the first particles and the second particles is well balanced with the spring constant, which makes it possible to improve the charge/discharge cycle characteristics. The first particles may have a compression breaking strength of, for example, 25 MPa or more to 50 MPa or less. The first particles may have a compression breaking strength of, for example, 50 MPa or more to 70 MPa or less.

(Second Particles)

The second particles may have a d50 of, for example, 1 μm or more to 30 μm or less. The second particles may have a d50 smaller than the first particles, which may improve the filling of the first particles and the second particles. The second particles may have a d50 of, for example, 1 μm or more to 8 μm or less. The shape of the second particles should not be particularly limited. The second particles may be, for example, spherical, bulky or the like.

The second particles are made of silicon oxide. However, it is not limited that the second particles contain only silicon oxide. The second particles may contain trace amounts of impurities or the like that are inevitably mixed in manufacture, for example.

It should be note that the composition ratio of silicon (Si) and oxygen (O) is not particularly limited. Silicon and oxygen may have any composition ratio known in the art.

For example, silicon oxide may be represented by the following formula (I):

$$SiO_x \qquad (I)$$

(wherein x satisfies $0<x\leq 1.5$)

In the above formula (I), x may satisfy $0.5\leq x\leq 1.5$. In the above formula (I), x may satisfy $1\leq x\leq 1.5$. In this range, for example, it is possible to improve the balance between the charge/discharge cycle characteristics and the capacity.

The ratio of the second particles to the total amount of the first particles and the second particles is 2 mass % or more to 10 mass % or less. If the ratio of the second particles is less than 2 mass %, the increase in capacity is small. If the second particles exceeds 10 mass %, even though the spring constant is 700 kN/mm or more, the negative electrode plate may deform, in other words, the charge/discharge cycle characteristics may be deteriorated. The ratio of the second particles to the total amount of the first particles and the second particles may be, for example, 4 mass % or more to 8 mass % or less. In this range, it is possible to improve the balance between the charge/discharge cycle characteristics and the capacity, for example.

(Binder)

The binder bonds the components of the negative electrode composite material layer 22 to each other. The binder bonds the negative electrode composite material layer 22 and the negative electrode current collector 21. The binder of the present embodiment may have a high elastic modulus. If the binder has a high elastic modulus, it is possible to increase the spring constant of the negative electrode plate 20. For example, a combination of three kinds of carboxymethyl cellulose (CMC), polyacrylic acid (PAA) and styrene butadiene rubber (SBR) may be used as the binder. In other words, the negative electrode composite material layer 22 may contain CMC, PAA and SBR, which makes it possible to increase the spring constant of the negative electrode plate 20. However, as long as the negative electrode plate 20 has a spring constant of 700 kN/mm or more to 3000 kN/mm or less, any binder other than CMC, PAA and SBR may be used.

For example, an SBR with a high glass transition temperature (Tg) may be used, which makes it possible to increase the spring constant of the negative electrode plate 20. For example, an SBR having a Tg of about 0° C. may be used. In general, an SBR may have a Tg of about −30° C. Tg of a binder may be determined by a method in accordance with "JIS K6240: Raw material rubber—Determination of the glass transition temperature by differential scanning calorimetry (DSC)".

From the viewpoint of increasing the spring constant of the negative electrode plate 20, the binder may be, for example, 3.5 parts by mass or more to 4 parts by mass or less relative to 100 parts by mass of the negative electrode active material. From the same viewpoint, the ratio of the total mass of CMC and PAA to the mass of SBR may be 2.5 or more to 3 or less. From the same viewpoint, the ratio of the mass of PAA to the mass of CMC may be 1 or more to 5 or less. The ratio of the mass of PAA to the mass of CMC may be 2 or more to 5 or less.

(Other Components)

The negative electrode composite material layer 22 may further include, for example, a conductive material. The conductive material may be, for example, 1 part by mass or more to 10 parts by mass or less relative to 100 parts by mass of the negative electrode active material. The conductive material is not particularly limited. The conductive material may be, for example, carbon black, activated carbon, carbon fiber, carbon nanotube or the like. The carbon black may be, for example, acetylene black (AB), Ketjen black (registered trademark) or the like.

"Spring Constant of Negative Electrode Plate"

The spring constant of the negative electrode plate 20 may be measured by using a common compression tester. For example, a universal tester manufactured by A & D Corporation or an equivalent one may be used. The measurement may be carried out in an environment of room temperature (20° C. or more to 25° C. or less). The compression tester applies a load to the negative electrode plate 20 in its thickness direction, and measures the displacement (deformation) of the thickness. The relationship between the load and the displacement of the thickness is plotted in two-dimensional coordinates to obtain a load-displacement curve. The spring constant is calculated as an inclination of the load-displacement curve in the elastic deformation region. The spring constant may be measured at least three times, and the arithmetic average of the at least three measurements may be adopted as the measurement result. The spring constant of the negative electrode plate 20 may be considered as the spring constant of the negative electrode composite material layer 22 substantially. Since the negative electrode composite material layer 22 is softer than the negative electrode current collector 21, it is considered that the deformation caused by the load mainly occurs in the negative electrode composite material layer 22.

The negative electrode plate 20 has a spring constant of 700 kN/mm or more to 3000 kN/mm or less. Since the spring constant of the negative electrode plate 20 is 700 kN/mm or more, the negative electrode plate 20 may have a rigidity to withstand the expansion and contraction of silicon oxide. In other words, if the spring constant is 700 kN/mm or more, the charge/discharge cycle characteristics may be improved. However, if the spring constant exceeds 3000 kN/mm, the charge/discharge cycle characteristics may be deteriorated. The considerable reason may be that the binder is likely to break easily.

The negative electrode plate 20 may have a spring constant of 1000 kN/mm or more to 2500 kN/mm or less. The negative electrode plate 20 may have a spring constant of 1200 kN/mm or more. The negative electrode plate 20 may have a spring constant of 1500 kN/mm or more. In this range, it is possible to improve the charge/discharge cycle characteristics.

<Positive Electrode Plate>

The positive electrode plate 10 includes a positive electrode current collector 11 and a positive electrode composite material layer 12. In other words, the positive electrode plate 10 at least includes the positive electrode composite material layer 12. The positive electrode current collector 11 is electrically connected to the positive electrode terminal 51. The positive electrode current collector 11 may be, for example, an Al foil, an Al alloy foil or the like. The positive electrode current collector 11 may have a thickness of, for example, 5 μm or more to 50 μm or less. The positive electrode composite material layer 12 is formed on a surface of the positive electrode current collector 11. The positive electrode composite material layer 12 may be formed on both the front surface and the back surface of the positive electrode current collector 11. The positive electrode composite material layer 12 may have a thickness of, for example, 10 μm or more to 200 μm or less.

The positive electrode composite material layer 12 includes, for example, a positive electrode active material, a conductive material and a binder. The positive electrode active material may be in the form of particles. The positive electrode active material may have a d50 of, for example, 1 μm or more to 30 μm or less. The positive electrode active material is not particularly limited. The positive electrode active material may be, for example, $LiCoO_2$, $LiNiO_2$, $LiMnO_2$, $LiMn_2O_4$, $Li(Ni_{1/3}Co_{1/3}Mn_{1/3})O_2$, $LiFePO_4$ or the like. The positive electrode active material may be used alone in one kind or in combination of two or more kinds.

The conductive material is not particularly limited. The conductive material may be, for example, carbon black or the like. The conductive material may be, for example, 1 part by mass or more to 10 parts by mass or less relative to 100 parts by mass of the positive electrode active material. The binder is also not particularly limited. The binder may be, for example, polyvinylidene difluoride (PVDF) or the like. The binder may be, for example, 1 part by mass or more to 10 parts by mass or less relative to 100 parts by mass of the positive electrode active material.

<Separator>

The separator 30 is a porous film. The separator 30 may have a thickness of, for example, 5 μm or more to 50 μm or less. The separator 30 is electrically insulating. The separator 30 may be made of, for example, polyethylene (PE), polypropylene (PP) or the like.

The separator 30 may have a single-layer structure, for example. The separator 30 may be made of, for example, a porous PE film only. The separator 30 may have a multilayer structure, for example. The separator 30 may be formed, for example, by laminating a porous PP film, a porous PE film, and a porous PP film in order. The separator may include a heat resistant layer on its surface. The heat resistant layer contains a heat resistant material. The heat resistant material may be, for example, alumina, polyimide or the like.

<Non-Aqueous Electrolyte>

The non-aqueous electrolyte may be a liquid electrolyte. The non-aqueous electrolyte may be, for example, an electrolyte solution, an ion liquid or the like. The electrolyte solution contains a solvent and a supporting electrolyte. The electrolyte solution may contain, for example, 0.5 mol/l or more to 2 mol/l or less of a supporting electrolyte. The supporting electrolyte may be, for example, $LiPF_6$, $LiBF_4$, $Li[N(FSO_2)_2]$, $Li[N(CF_3SO_2)_2]$ or the like. The supporting electrolyte may be used alone in one kind or in combination of two or more kinds.

The solvent may be, for example, a mixture of cyclic carbonate and chain carbonate. The mixing ratio may be, for example, cyclic carbonate:chain carbonate=1:9 to 5:5 in volume ratio. The cyclic carbonate may be, for example, ethylene carbonate (EC), propylene carbonate (PC), butylene carbonate (BC), fluoroethylene carbonate (FEC) or the like. The cyclic carbonate may be used alone in one kind or in combination of two or more kinds.

The chain carbonate may be, for example, dimethyl carbonate (DMC), ethyl methyl carbonate (EMC), diethyl carbonate (DEC) or the like. The chain carbonate may be used alone in one kind or in combination of two or more kinds.

The solvent may include, for example, lactone, cyclic ether, chain ether, and carboxylic ester or the like. The lactone may be, for example, γ-butyrolactone (GBL), β-valerolactone or the like. The cyclic ether may be, for example, tetrahydrofuran (THF), 1,3-dioxolane, 1,4-dioxane or the like. The chain ether may be, for example, 1,2-dimethoxyethane (DME) or the like. The carboxylic ester may be, for example, methyl formate (MF), methyl acetate (MA), methyl propionate (MP) or the like.

In addition to the solvent and the supporting electrolyte, the electrolyte solution may further contain various functional additives. The electrolyte solution may contain, for example, 1% by mass or more to 5% by mass or less of a functional additive. As examples of the functional additive, a gas generating agent (overcharge additive), a SEI (solid electrolyte interface) film forming agent or the like may be given. The gas generating agent may be, for example, cyclohexylbenzene (CHB), biphenyl (BP) or the like. The SEI film forming agent may be, for example, vinylene carbonate (VC), vinylethylene carbonate (VEC), $Li[B(C_2O_4)_2]$ (LiBOB), $LiPO_2F_2$, propane sultone (PS), ethylene sulfite (ES) or the like. The functional additive may be used alone in one kind or in combination of two or more kinds.

In the present embodiment, a gel electrolyte or a solid electrolyte may be used in place of the liquid electrolyte, and a gel electrolyte and a solid electrolyte may be used in addition to the liquid electrolyte.

<Usage and the Like>

The battery 100 of the present embodiment is expected to have a high capacity. Further, the battery 100 of the present embodiment is expected to have excellent charge/discharge cycle characteristics. The battery with the above-mentioned characteristics may be used as a power source of, for example, a hybrid vehicle (HV), an electric vehicle (EV), a plug-in hybrid vehicle (PHV) or the like. However, the battery 100 of the present embodiment is not limited to automotive applications. The battery 100 of the present embodiment may be used in various applications.

EXAMPLES

Hereinafter, examples of the present disclosure will be described. It should be noted that the following description is not intended to limit the scope of claims.

Example 1

1. Production of Negative Electrode Plate

The following materials were prepared.

first particles: graphite particles (spherical natural graphite) coated with the amorphous carbon material second particles: silicon oxide binder: CMC powder, PAA powder, SBR aqueous dispersion solvent: water negative electrode current collector: Cu foil The compression breaking strength of the first particles was measured. The measuring machine is a micro compression tester manufactured by Shimadzu Corporation. The measurement results are listed in the following Table 1.

A powder mixture was prepared by mixing the first particles, the second particles, the CMC powder and the PAA powder. A paste was prepared by mixing the powder mixture with the solvent. Thereafter, the paste was mixed with the SBR aqueous dispersion. The mixing ratio of each of the materials is listed in the following Table 1.

The paste was coated on the surfaces (the front surface and the back surface) of the negative electrode current collector and dried, whereby a negative electrode composite material layer was formed. The negative electrode composite material layer was compressed, and after compression, the negative electrode composite material layer has a density of 1.5 g/cm$^3$. Thereby, the negative electrode plate was produced.

The spring constant of the negative electrode plate was measured according to the method described above. The measuring machine is a universal tester manufactured by A & D Corporation. The measurement results are listed in the following Table 1.

2. Production of Positive Electrode Plate

The following materials were prepared.
positive electrode active material: Li(Ni$_{1/3}$Co$_{1/3}$Mn$_{1/3}$)O$_2$
conductive material: AB
binder: PVDF
solvent: N-methyl-2-pyrrolidone
positive electrode current collector: Al foil A paste was prepared by mixing the positive electrode active material, the conductive material, the binder and the solvent. The mixing ratio is positive electrode active material:conductive material:binder=98:1:1 by mass. Thereafter, the paste was coated on the surface of the positive electrode current collector and dried, whereby a positive electrode composite material layer was formed. The positive electrode composite material layer was compressed. Thereby, the positive electrode plate was produced.

3. Assembling

A separator was prepared. An electrode group was formed by stacking a positive electrode plate, a separator and a negative electrode plate with the separator interposed between the positive electrode plate and the negative electrode plate. A case was prepared. The case is prismatic. The electrode group was housed in the case.

An electrolyte solution having the following composition was prepared.
supporting electrolyte: LiPF$_6$ (1 mol/l)
solvent: [EC:DMC:EMC=3:4:3 (volume ratio)]

The electrolyte solution was injected into the case, and the case was hermetically sealed. Thereby, a battery (prismatic lithium ion secondary battery) was manufactured. The battery is designed to have a rated capacity of 40 Ah in a voltage range of 3.0 to 4.2 V.

Examples 2 to 5, Comparative Example 1

Except that the mixing ratio of CMC, PAA and SBR was modified as listed in the following Table 1, a negative electrode plate was produced and a battery was manufactured in the same manner as in Example 1. Note that the SBR used in Example 5 has a Tg of about 0° C., while the SBR used in other examples has a Tg of about −30° C.

Examples 6 and 7, Comparative Example 2

Except that the density of the negative electrode composite material layer was modified as listed in the following Table 1, a negative electrode plate was produced and a battery was manufactured in the same manner as in Example 1.

Examples 8 to 11

Except that the first particles having different compression breaking strengths were used as listed in the following Table 1, a negative electrode plate was produced and a battery was manufactured in the same manner as in Example 1.

The first particles in Example 1 were prepared by performing a heat treatment at a temperature of 1100° C. The first particles in Examples 8 and 9 were prepared by increasing the coating amount of the amorphous carbon material and thereafter performing a heat treatment at a lower temperature (900° C.). The first particles of Example 10 were prepared by reducing the coating amount of the amorphous carbon material and thereafter performing a heat treatment at a higher temperature (1300° C.).

Examples 12 to 15, Reference Example

Except that the ratio of the second particles to the total amount of the first particles and the second particles was modified as listed in the following Table 1, and in accordance with the capacity of the negative electrode plate, the capacity of the positive electrode plate (the amount of the positive electrode active material) was modified, a negative electrode plate was produced and a battery was manufactured in the same manner as in Example 1. In the following Table 1, the value listed in the column of "capacity (design value)" is a relative value when the capacity of the battery in the reference example which contains no second particle (silicon oxide) is set to 100%.

<Evaluation>

"Cycle Test"

One round of constant current and constant voltage (CCCV) mode charging and CCCV mode discharging performed at an environmental temperature of 25° C. was denoted as one cycle, and 500 cycles of charging and discharging were carried out.

(CCCV mode charging)
current at constant current charging: 28 A
voltage at constant voltage charging: 4.2 V
cut current: 2 A
(CCCV mode discharging)
current at constant current discharging: 28 A
voltage at constant voltage discharging: 2.5 V
cut current: 2 A The capacity retention rate was calculated by dividing the discharge capacity at the 500th cycle by the discharge capacity at the 1st cycle. The capacity retention rate is listed in the following Table 1. The higher the capacity retention ratio is, the better the charge/discharge cycle characteristics will be.

"Low Temperature Test"

The battery was charged to 60% of its rated capacity. One round of constant current (CC) mode charging and CC mode discharging performed at an environmental temperature of 0° C. was denoted as one cycle, and 500 cycles of charging and discharging were carried out.

(CC mode charging)
current: 160 A
charging time: 3 min
cut voltage: 4.2 V
(CC mode discharge)
current: 160 A
discharging time: 3 min
cut voltage: 2.5 V After 500 cycles, the battery was disassembled, and the negative electrode plate was recovered. Whether or not lithium was precipitated on the surface of the negative electrode plate was confirmed. The confirmation results are listed in the following Table 1. In the column of the low temperature test in the following Table 1, the capital letter N (negative) indicates that no lithium was precipitated, and the capital letter P (positive) indicates that lithium was precipitated. If the confirmation result is "N", it means that the charging reactivity at low temperature is excellent.

TABLE 1

Lists of Examples and Comparative Examples

| | Negative Electrode Plate — Negative Electrode Composite Material Layer — Compositions | | | | | | | | Evaluation | | |
|---|---|---|---|---|---|---|---|---|---|---|---|
| | 1st particle graphite particle and amorphous carbon material mass part | 2nd particle SiO mass part | Binder CMC mass part | Binder PAA mass part | Binder SBR mass part | Density g/cm³ | Compression breaking strength MPa | Spring constant kN/mm | Capacity (design capacity) % | Capacity retention rate in cycle test (500 cyc) % | Low temperature test |
| Example 1 | 96 | 4 | 1.5 | 1 | 1 | 1.5 | 25 | 1000 | 103.3 | 83 | N |
| Example 2 | 96 | 4 | 1.5 | 1.5 | 1 | 1.5 | 25 | 1200 | 103.3 | 84 | N |
| Example 3 | 96 | 4 | 1 | 2 | 1 | 1.5 | 25 | 1500 | 103.3 | 85 | N |
| Example 4 | 96 | 4 | 0.5 | 2.5 | 1 | 1.5 | 25 | 2500 | 103.3 | 86 | N |
| Example 5 | 96 | 4 | 0.5 | 2.5 | 1*¹ | 1.5 | 25 | 3000 | 103.3 | 78 | N |
| Comparative Example 1 | 96 | 4 | 1.5 | — | 1 | 1.5 | 25 | 200 | 103.3 | 68 | N |
| Example 6 | 96 | 4 | 1.5 | 1 | 1 | 1.7 | 25 | 1100 | 103.3 | 84 | N |
| Example 7 | 96 | 4 | 1.5 | 1 | 1 | 1.8 | 25 | 1200 | 103.3 | 84 | N |
| Comparative Example 2 | 96 | 4 | 1.5 | 1 | 1 | 1.4 | 25 | 800 | 103.3 | 65 | N |
| Example 8 | 96 | 4 | 1.5 | 1 | 1 | 1.5 | 50 | 1200 | 103.3 | 82 | N |
| Example 9 | 96 | 4 | 1.5 | 1 | 1 | 1.5 | 70 | 1400 | 103.3 | 80 | N |
| Example 10 | 96 | 4 | 1.5 | 1 | 1 | 1.5 | 15 | 700 | 103.3 | 85 | P |
| Example 11 | 96 | 4 | 1.5 | 1 | 1 | 1.5 | 90 | 1600 | 103.3 | 76 | N |
| Example 12 | 94 | 6 | 1.5 | 1 | 1 | 1.5 | 25 | 1050 | 104.6 | 81 | — |
| Example 13 | 92 | 8 | 1.5 | 1 | 1 | 1.5 | 25 | 1100 | 105.6 | 80 | — |
| Reference Example | 100 | 0 | 1.5 | 1 | 1 | 1.5 | 25 | 950 | 100 | 86 | — |
| Example 14 | 98 | 2 | 1.5 | 1 | 1 | 1.5 | 25 | 900 | 101.5 | 83 | — |
| Example 15 | 90 | 10 | 1.5 | 1 | 1 | 1.5 | 25 | 1150 | 105.9 | 76 | — |

*¹The SBR in Example 5 has a Tg of about 0° C., and the SBR in other examples has a Tg of about −30° C.

<Results>

As illustrated in the above Table 1, the charge/discharge cycle characteristics in Examples satisfying both of the following conditions (A) and (B) were improved compared with those in Comparative examples not satisfying the following conditions (A) or (B). In the examples, it is considered that the first particles and the second particles are in close contact with each other, and the negative electrode plate has rigidity to withstand the expansion and contraction of silicon oxide.

(A) The negative electrode composite material layer has a density of 1.5 g/cm³ or more, and (B) the spring constant is 700 kN/mm or more to 3000 kN/mm or less.

A sectional sample was taken from the negative electrode composite material layer. The sectional sample was processed by using a cross section polisher (CP). The sectional sample was observed under an electron microscope (SEM). In the negative electrode composite material layer of Comparative example 2, a portion where the second particles were embedded in the first particles could not be confirmed. The negative electrode composite material layer of Comparative example 2 has a density of 1.4 g/cm³. In the negative electrode composite material layer of Example 1, a portion where the second particles were embedded in the first particles was confirmed. The negative electrode composite material layer of Example 1 has a density of 1.5 g/cm³.

Figure 3:
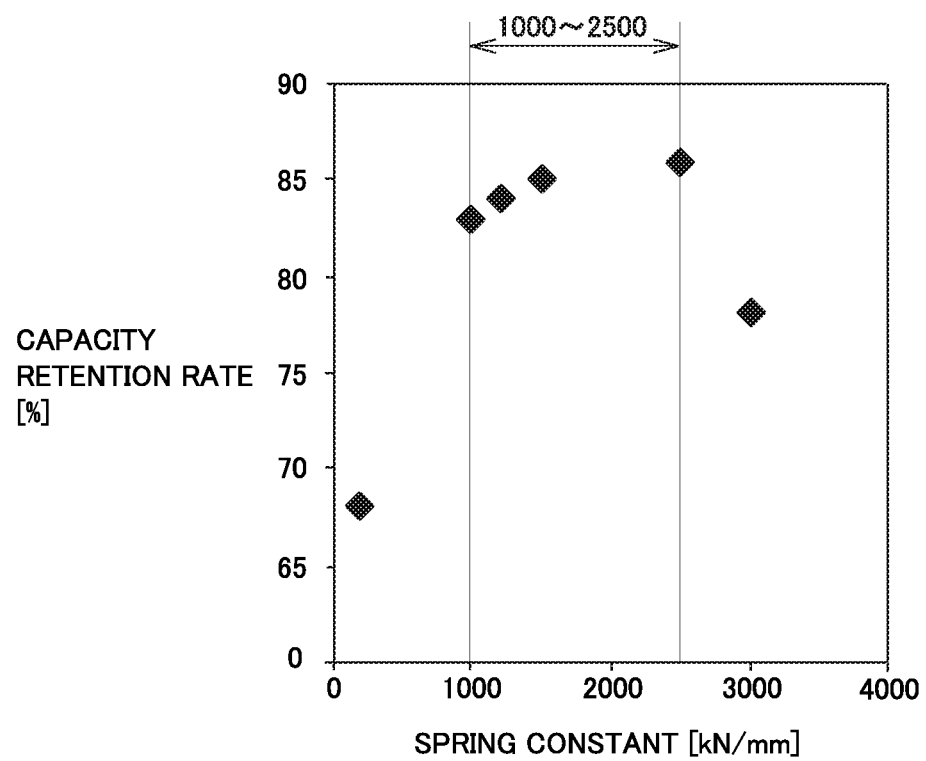
FIG. 3 is a graph illustrating a relationship between the spring constant of a negative electrode plate and the capacity retention rate.

FIG. 3 is a graph illustrating a relationship between the spring constant of the negative electrode plate and the capacity retention rate of the battery. The relationship between the spring constant and the capacity retention rate for each of Examples 1 to 5 and Comparative Example 1 was illustrated in FIG. 3. It is obvious that in the range where the spring constant is 1000 kN/mm or more to 2500 kN/mm or less, the capacity retention rate was improved greater.

In the above Table 1, it is obvious that if the compression breaking strength of the first particles was 70 MPa or less, the capacity retention rate was improved. The considerable reason may be that it is easy for the second particles to embed into the first particles. In Example 10 where the compression breaking strength of the first particles was less than 25 MPa, the precipitation of lithium was confirmed in the low temperature test. The considerable reason may be that the charging reactivity at low temperature is deteriorated due to the fact that the coating amount of the amorphous carbon material is reduced.

In the above Table 1, when the ratio of the second particles to the total amount of the first particles and the second particles is in the range of 4 mass % or more to 8 mass % or less, the charge/discharge cycle characteristics and the capacity are well balanced.

The embodiments and examples disclosed herein are illustrative and non-restrictive in any respect. The technical scope indicated by the claims is intended to include any modifications within the scope and meaning equivalent to the terms of the claims.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A negative electrode plate for a non-aqueous electrolyte secondary battery, comprising:
   at least a negative electrode composite material layer,
   the negative electrode composite material layer having a density of 1.5 g/cm$^3$ or more,
   the negative electrode composite material layer containing at least first particles, second particles and a binder,
   the first particles containing graphite particles and an amorphous carbon material,
   the amorphous carbon material being coated on the surface of each graphite particle,
   the second particles being made of silicon oxide,
   the ratio of the second particles to the total amount of the first particles and the second particles being 2 mass % or more to 10 mass % or less, and
   the negative electrode plate having a spring constant of 700 kN/mm or more to 3000 kN/mm or less.

2. The negative electrode plate according to claim 1, wherein
   the first particles have a compression breaking strength of 25 MPa or more to 70 MPa or less.

3. The negative electrode plate according to claim 1, wherein
   the negative electrode plate has a spring constant of 1000 kN/mm or more to 2500 kN/mm or less.

4. The negative electrode plate according to claim 1, wherein
   the ratio of the second particles to the total amount of the first particles and the second particles is 4 mass % or more to 8 mass % or less.

5. A non-aqueous electrolyte secondary battery comprising at least the negative electrode plate according to claim 1.

* * * * *